US010841249B2

(12) United States Patent
Lim et al.

(10) Patent No.: US 10,841,249 B2
(45) Date of Patent: Nov. 17, 2020

(54) SYSTEM AND METHOD FOR BOT PLATFORM

(71) Applicant: Samsung Electronics Co., Ltd., Suwon-si (KR)

(72) Inventors: Patrick H. Lim, Cupertino, CA (US); King-Sun Wai, Castro Valley, CA (US); Bo Niu, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 16/128,974

(22) Filed: Sep. 12, 2018

(65) Prior Publication Data
US 2019/0104093 A1 Apr. 4, 2019

Related U.S. Application Data

(60) Provisional application No. 62/566,745, filed on Oct. 2, 2017.

(51) Int. Cl.
H04L 12/58 (2006.01)
G06F 11/34 (2006.01)
G06F 11/14 (2006.01)
G06F 11/07 (2006.01)
G06Q 50/00 (2012.01)

(52) U.S. Cl.
CPC .......... H04L 51/02 (2013.01); G06F 11/0766 (2013.01); G06F 11/1471 (2013.01); G06F 11/3476 (2013.01); H04L 51/04 (2013.01); H04L 51/32 (2013.01); G06Q 50/01 (2013.01); H04L 51/046 (2013.01); H04L 51/16 (2013.01); H04L 51/18 (2013.01)

(58) Field of Classification Search
CPC ......... H04L 51/02; H04L 51/04; H04L 51/32; H04L 51/18; H04L 51/046; H04L 51/16; G06F 11/0766; G06F 11/3476; G06F 11/1471; G06F 11/0751; G06Q 50/01
USPC ........................................................ 709/206
See application file for complete search history.

(56) References Cited

U.S. PATENT DOCUMENTS

| 7,558,526 | B2 | 7/2009 | Guo |
| 8,346,563 | B1 | 1/2013 | Hjelm et al. |
| 9,563,336 | B2 | 2/2017 | Barak et al. |
| 10,019,443 | B2 * | 7/2018 | Suleman ............. G06F 16/9535 |
| 10,521,496 | B1 * | 12/2019 | Goodwin ............. G06F 40/117 |
| 2009/0281966 | A1 | 11/2009 | Biggs et al. |
| 2011/0078105 | A1 | 3/2011 | Wallace |

(Continued)

FOREIGN PATENT DOCUMENTS

KR 10-1334066 B1 11/2013

OTHER PUBLICATIONS

International Search Report dated Jan. 7, 2019 in connection with International Patent Application No. PCT/KR2018/011683, 3 pages.

(Continued)

Primary Examiner — Tu T Nguyen

(57) ABSTRACT

A method for operating a bot platform includes receiving, from a bot client, an input associated with an intent, and storing the input associated with the intent as part of a user profile maintained at the bot platform. The method further includes storing the input associated with the intent as part of a user profile maintained at the bot platform, and passing the input to the selected bot.

20 Claims, 11 Drawing Sheets

(56) References Cited

U.S. PATENT DOCUMENTS

| | | |
|---|---|---|
| 2015/0179168 A1 | 6/2015 | Hakkani-Tur et al. |
| 2016/0379106 A1 | 12/2016 | Qi et al. |
| 2017/0039823 A1 | 2/2017 | Srivasthsa et al. |
| 2017/0125008 A1 | 5/2017 | Maisonnier et al. |
| 2017/0180276 A1 | 6/2017 | Gershony et al. |
| 2017/0187654 A1 | 6/2017 | Lee |
| 2017/0279906 A1 | 9/2017 | Laird-McConnell et al. |
| 2018/0181558 A1* | 6/2018 | Emery ................ G06F 16/3329 |

OTHER PUBLICATIONS

Written Opinion of the International Searching Authority dated Jan. 7, 2019 in connection with International Patent Application No. PCT/KR2018/011683, 6 pages.

Extended European Search Report regarding Application No. 18864202.9, dated May 6, 2020, 8 pages.

\* cited by examiner

FIG. 3
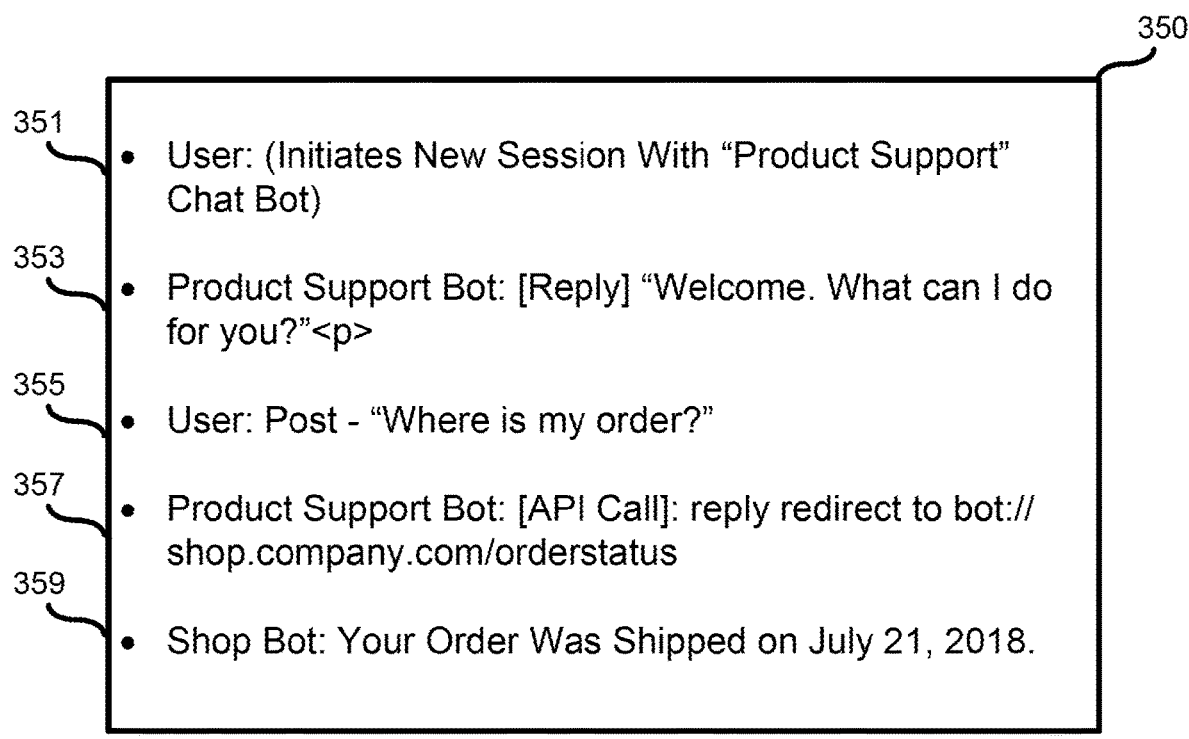

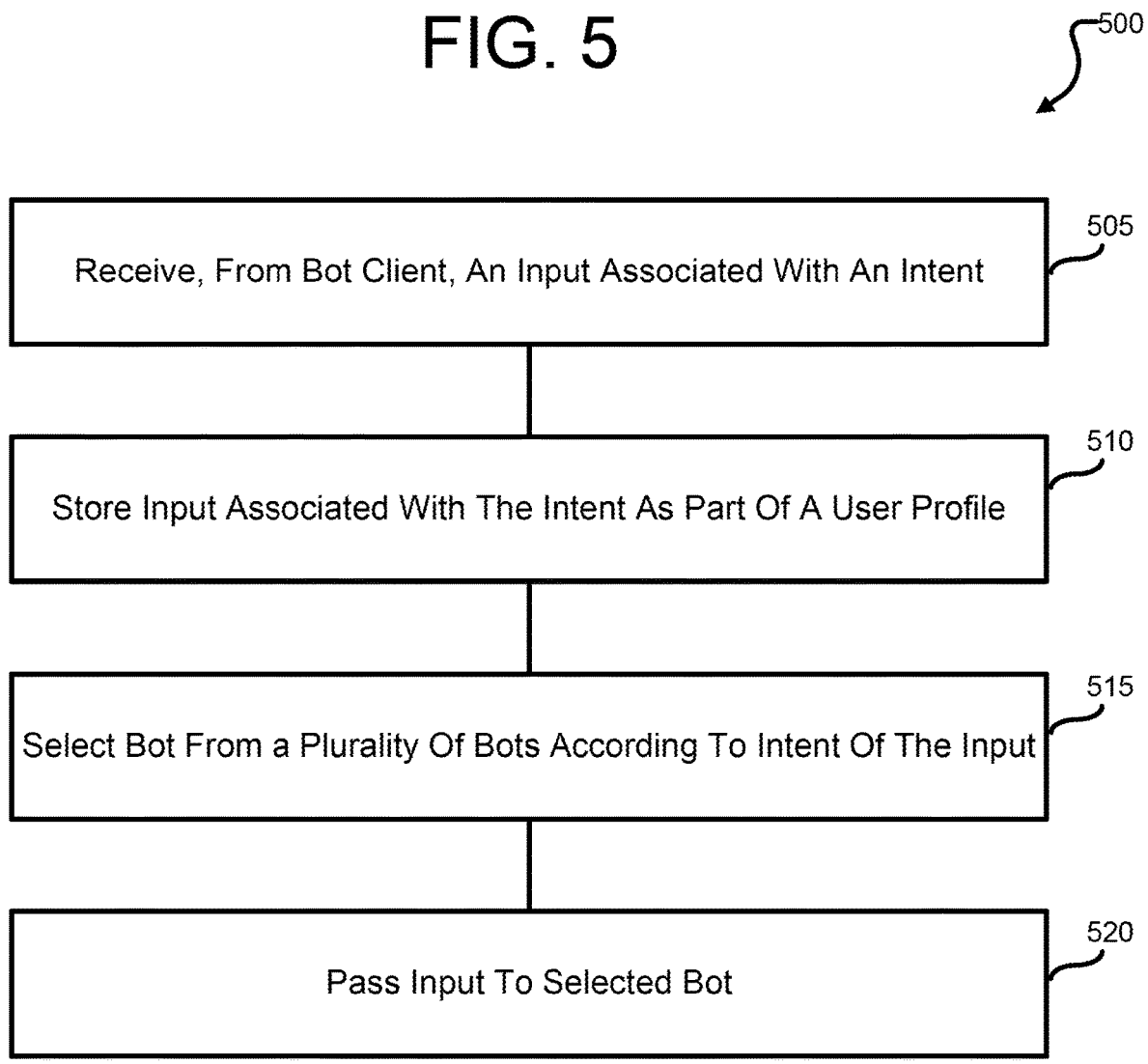

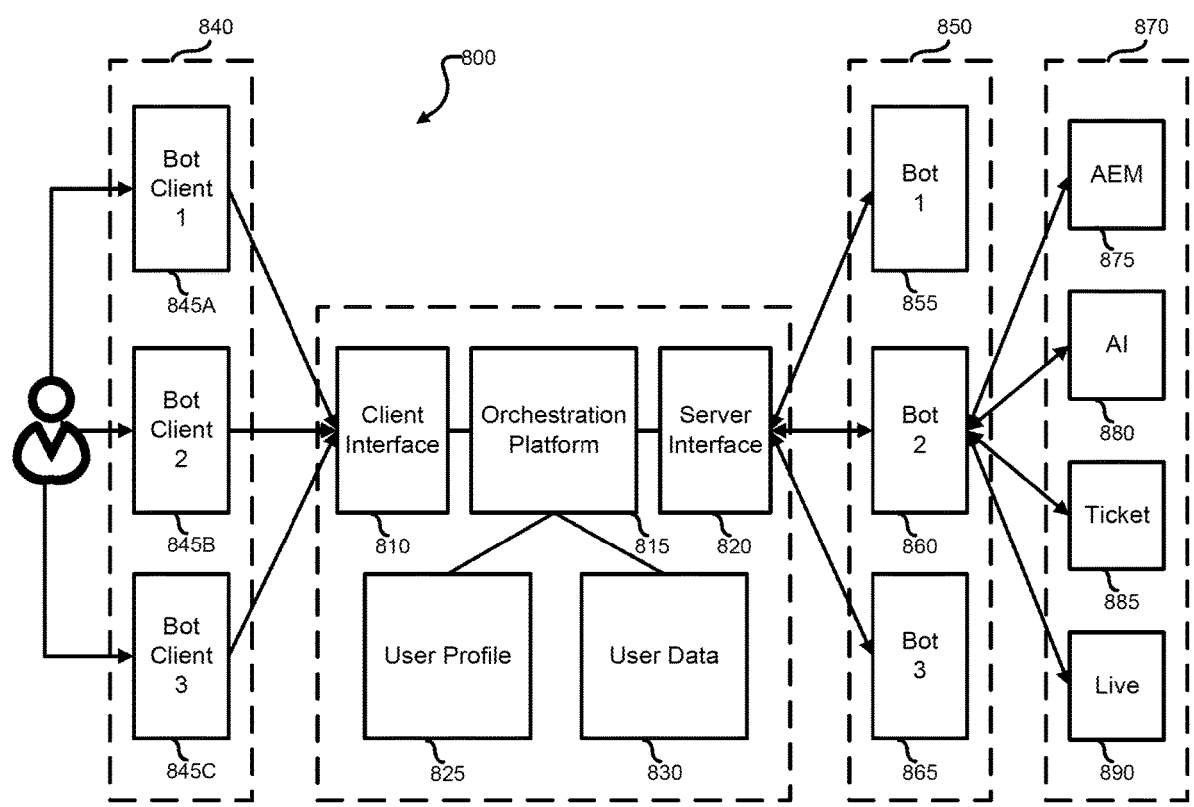

FIG. 9

```
{
    "server":{
        "action": [
            {
                "command": "jumptointent",
                "newAgent": "taxonomy",
                "newIntent": "s8" or "@api.ai:parameters.newIntent",
            }
        ],
    },
    "client":{
        "text": "text reply" or "@api.ai:fulfillment.speech",
        "card": [
            {
                "label": "Phone1-S",
                "text": "Phone1-S",
                "postback": "bot://support.company.com/taxonomy/galaxy-s",
                "imageUrl":   "http://s7d2.scene7.com/is/image/CompanyUS/phone1_pselector_pcd_dskt_v3?$cm-g-primary-selcection-jpg$"
            }
        ]
    }
}
```

905 — server block
910 — client block
900

FIG. 10

```
                                                                                1000
           1005                                                                ╱
         ╱       1020
   Data: {     ╱
        menu:[
        {
     1010    text: "here's are the things I can support<card></card>",
           ╲ card: [{
                   "label": "mobile",
1015a              "text": "Select the option Lock Screen and Security",
                   "postback":"bot://support.company.com/agentid/9d0877bf-
        8f95-4c0f-aed6-306d3b2c6ac3-no"
                   "imageUrl": "images/img_step2.jpg"
           },
           {
                  "label": "tv",
                  "text": "Select the option Lock Screen and Security",
1015b             "postback":"bot://support.company.com/agentid/9d0877bf-8f95-
                  4c0f-aed6-306d3b2c6ac3-no"
                  "imageUrl": "images/img_step2.jpg"
               }]
           },
           {
           text: "here's are the things I can support<option></option>",
1025a      option: [{ postback:"bot://support.company.com/agentid/9d0877bf-8f95-4c0f-aed6-
           306d3b2c6ac3-yes"

text:"Yes, let's get started!"
           },
1025b      {
           postback:"bot://support.company.com/agentid/9d0877bf-8f95-4c0f-aed6-
           306d3b2c6ac3-no"

text:"No, maybe later"
           }]
         },
         {
         text: "Or otherwise tell me your problem"
         }
       ]
    }
```

SYSTEM AND METHOD FOR BOT PLATFORM

CROSS-REFERENCE TO RELATED APPLICATION AND CLAIM OF PRIORITY

This application claims priority under 35 U.S.C. § 119(e) to U.S. Provisional Patent Application No. 62/566,745 filed on Oct. 2, 2017. The above-identified provisional patent application is hereby incorporated by reference in its entirety.

TECHNICAL FIELD

This disclosure relates generally to system integration. More specifically, this disclosure relates to a system and method for a chat bot platform.

BACKGROUND

"Bots," or electronic agents for digitally interpreting and providing responses to expressions of intent, such as online chat sessions, inputs to a speech recognition platform, or web content, present significant opportunities for new and improved modes of interaction between humans and computer systems. By resolving intents from natural language expressions of intent, certain bots enhance the functionality of the connection between a user and back-end systems, in that they accurately translate the user's intent-based requests into appropriate commands (for example, structured database queries) to be processed by back-end systems.

The technical challenges associated with fully realizing the potential of bots as user interfaces for computer systems include extensibility and integration of different bots. Many bots can only translate expressions of user intent within a limited, predefined range of contexts. For example, a bot built to handle spoken requests pertaining to airline reservations may balk at, and fail to process, spoken requests pertaining to different transactions, such as inquiries about lost luggage or hotel reservations. In such cases, a user may be required to look, by herself, for a different bot with the functionality to handle the request. From a user experience/user interface (UX/UI) perspective, initiating sessions with multiple, siloed bots in order to find a bot capable of resolving and responding to the user's intent can be inefficient and frustrating. From an architectural, or systems design perspective, attempting to design a single, integrated bot to handle every foreseeable combination of input and intent, presents significant challenges, including, without limitation, inflexible design and the costs of "reinventing the wheel" associated with generating a single bot to provide functionality already provided by existing bots.

SUMMARY

This disclosure provides a system and method for a chat bot platform.

In a first embodiment, a method for operating a bot platform includes receiving, from a bot client, an input associated with an intent, and storing the input associated with the intent as part of a user profile maintained at the bot platform. The method further includes storing the input associated with the intent as part of a user profile maintained at the bot platform, and passing the input to the selected bot.

In a second embodiment, an apparatus includes a network interface, a processor, and a memory. The memory contains instructions, which when executed by the processor, cause the apparatus to receive, from a bot client via the network interface, an input associated with an intent and store the input associated with the intent as part of a user profile maintained at the bot platform. The memory also includes instructions, which when executed by the processor, cause the apparatus to select, according to the intent of the input, a bot from a plurality of bots communicatively connected to the bot platform to respond to the bot client, and pass the input to the selected bot.

In a third embodiment, a non-transitory computer-readable medium includes program code, which when executed by a processor, causes an apparatus to receive, from a bot client via a network interface, an input associated with an intent, and store the input associated with the intent as part of a user profile maintained at the bot platform. The program code, when executed by the processor, also causes the apparatus to select, according to the intent of the input, a bot from a plurality of bots communicatively connected to the bot platform to respond to the bot client, and pass the input to the selected bot.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 3 illustrates an example of certain functionalities provided by a system and method of a bot platform according to various embodiments of this disclosure;

FIG. 5 illustrates operations of a method of operating a bot platform according to certain embodiments of this disclosure;

FIG. 8 illustrates a network context of a bot client and a bot platform according to certain embodiments of this disclosure;

FIG. 9 illustrates an example of an application of a bot server markup language according to certain embodiments of the present disclosure; and FIG. 10 illustrates an example of an application of a bot client markup language according to various embodiments of this disclosure.

DETAILED DESCRIPTION

FIGS. 1 through 10 discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
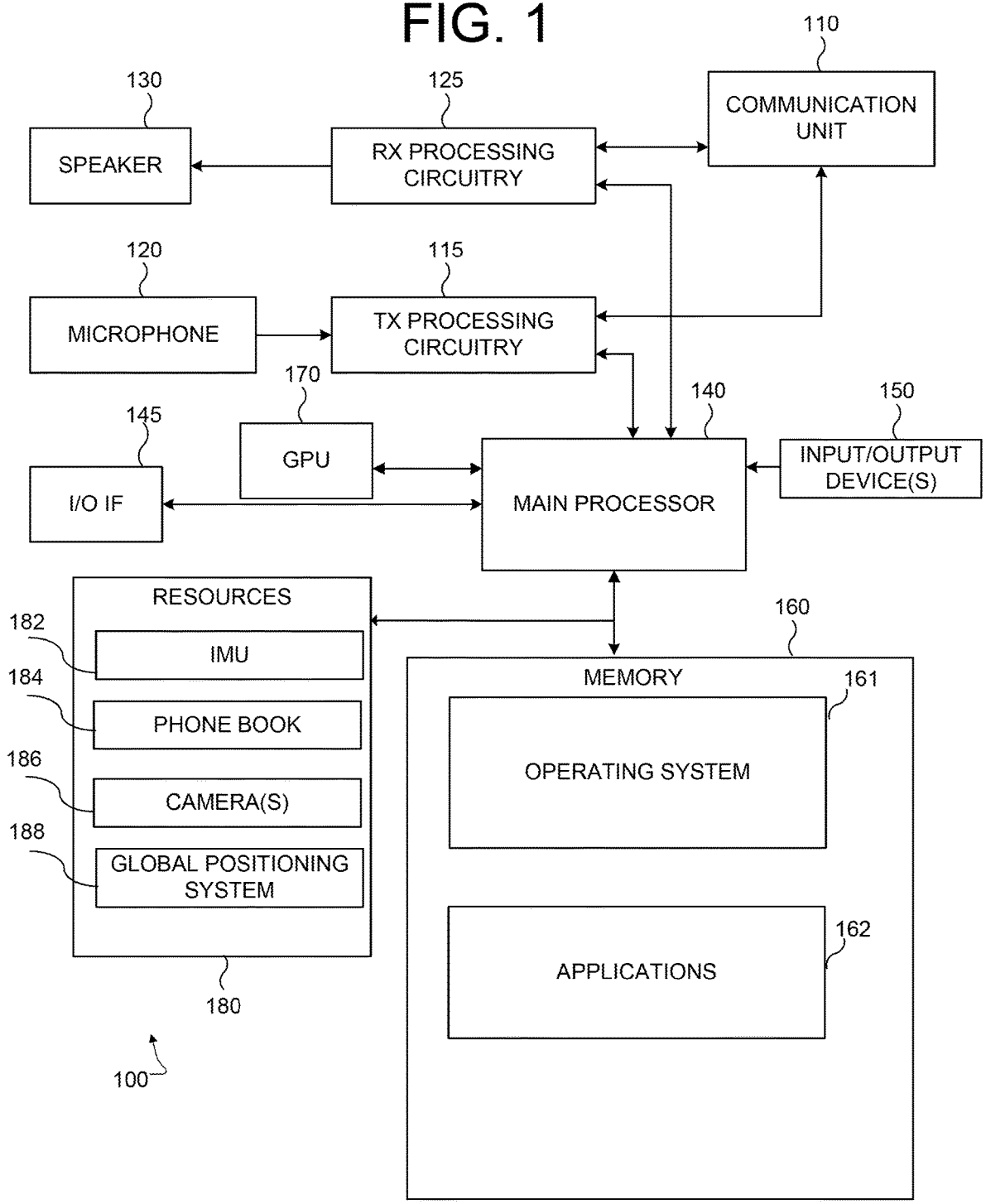
FIG. 1 illustrates an example of an electronic device for providing a bot client according to various embodiments of this disclosure.

FIG. 1 illustrates a non-limiting example of a device for providing a bot client according to some embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a Bluetooth® transceiver, or a Wi-Fi® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications (for example, banking or shopping applications) which provide a bot client (such as a chat interface) through which a user can provide inputs associated with an intent. In some embodiments, applications 162 include applications which combine a bot client with a web scraping, or content ingestion functionality. For example, applications 162 can include an application which crawls, or "spiders" through user review or frequently asked questions (FAQ) pages, collecting page content associated with user intents (for example, product reviews or complaints).

The communication unit 110 may receive an incoming RF signal, for example, a near field communication signal such as a BLUETOOTH® or WI-FI™ signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, resources 180 include an accelerometer or inertial motion unit 182, which can detect movements of the electronic device along one or more degrees of freedom. Additional resources 180 include, in some embodiments, a user's phone book 184, one or more cameras 186 of electronic device 100, and a global positioning system 188.

Although FIG. 1 illustrates one example of a device 100 for providing a bot client various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
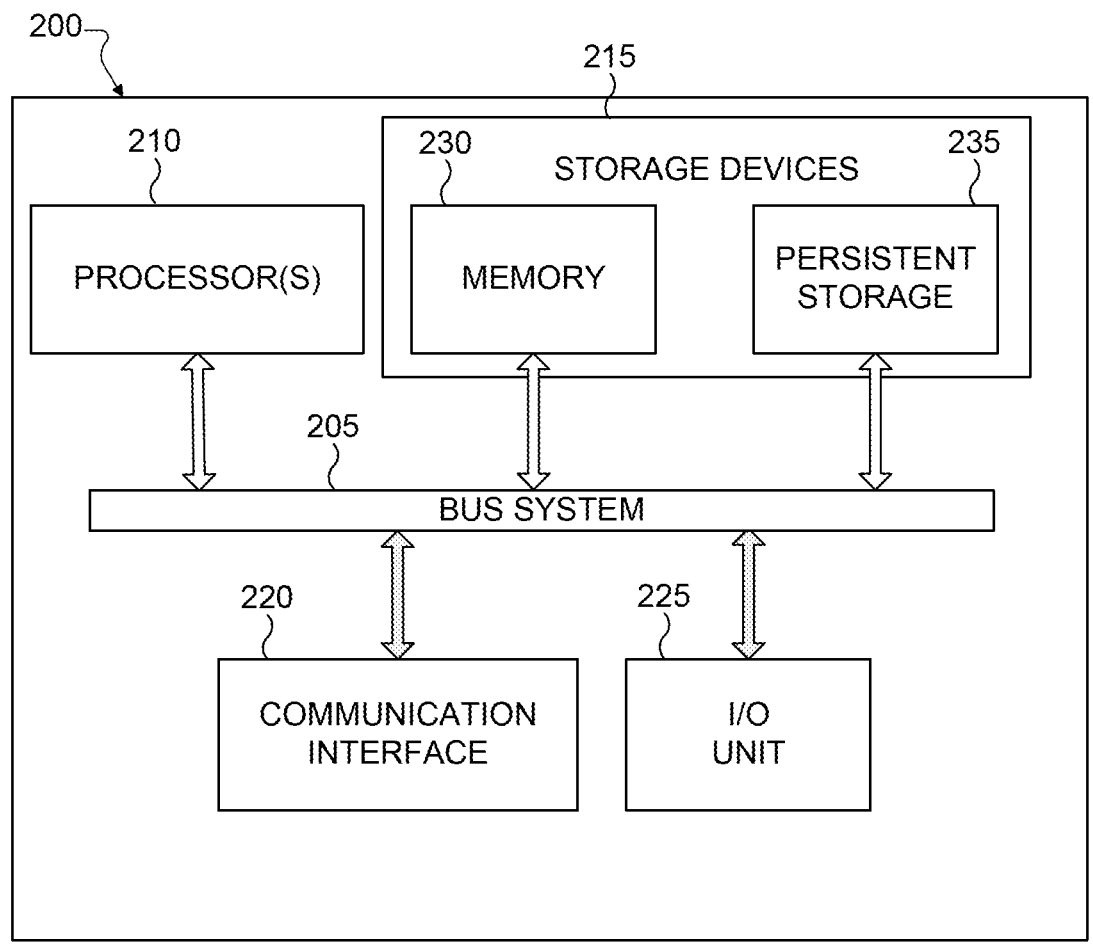
FIG. 2 illustrates an example of an electronic device for providing a system for a bot platform according to certain embodiments of this disclosure.

FIG. 2 illustrates an example of an electronic device 200 for providing a bot platform according to various embodiments of this disclosure.

Electronic device 200 can, in some embodiments, be embodied on a single standalone device, or on a device providing another server function (for example, a gateway server). Alternatively, in some cases, electronic device 200 may be embodied on multiple machines, for example, a server communicatively connected to one or more database servers. According to still further embodiments, electronic device 200 is embodied on a cloud computing platform.

As shown in FIG. 2, electronic device 200 includes a bus system 205 that supports communication between at least one processing device 210, at least one storage device(s) 215, at least one communications unit 220, and at least one input/output (I/O) unit 225.

The processing device 210 executes instructions that can be stored in a memory 230. The processing device 210 can include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215 that represent any structure (s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term According to certain embodiments, persistent storage 235 comprises one or databases or interfaces to databases embodied on separate machines, storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

FIG. 3 illustrates an example of certain functionalities provided by a system and method of a bot platform according to various embodiments of this disclosure.

Referring to the non-limiting example of FIG. 3, box 300 depicts content displayed on a screen of an electronic device (for example, device 100 in FIG. 1) providing one or more chat bot clients. Similarly, box 350 illustrates operations performed at the electronic device, and a bot platform (for example, a bot platform implemented on electronic device 200 in FIG. 2).

In some embodiments, a user initiates a session with a bot client (for example, an application running locally on the electronic device). In this non-limiting example, by operation 351, a user has initiated a chat session with a bot client associated with a product support application. By initiating the chat session, the user is connected to, and able to interface with the product support bot, such as through a websocket or http connection. According to some embodiments, the bot client is not connected directly to the product support bot, but rather, via a bot platform, which mediates the passage of information from the bot client to the product support bot, and, when necessary, also orchestrates redirection of user inputs to other bots capable of providing responses associated with the user's intent.

According to certain embodiments, at operation 353, the product support bot provides a reply to the bot client's initiation of the session. For example, the product support bot may send message 303, reading "Welcome. What can I do for you?"

Subsequent to the product support bot's transmission of reply, at operation 355, the user provides, to the product support bot, via the bot platform, an input 305 associated with an intent. In this example, the user inputs the natural language request "Where is my order?" In this case, the user's intent is to query a back-end system for information pertaining to an order from a shop. However, this input was presented as part of a session initiated with a product support bot, which, for the purposes of this purely explanatory example, is not connected to an order database and or other data store required to provide a response to the user input.

Certain embodiments according to this disclosure facilitate efficient, contextually aware handling of the "wrong turn" situation presented by a user providing an input to a bot which is not equipped to process the input. In some embodiments, of forcing the user to close the session and try present her input to a different bot, at operation 357, the product support bot makes an API call redirecting the user to a bot associated with "shop.company.com." In some embodiments, the product support bot and the shop bot are provided and developed by the same or related entities. In other embodiments, the product support bot and the shop bot are provided by unrelated entities, but are configured to communicate with an interface of the bot platform and each other using a standardized markup language.

In the non-limiting example of FIG. 3, redirection of the user's input from the product support bot to the shop bot was handled by the product support, such as in response to a deep link between the determined intent of the user's input and the shop bot. According to other embodiments, the redirection of the user's input is handled by the bot platform, which can, identify the input of the user's intent (for example, with a pretrained model for associating input terms and context with intent) and select a bot from a plurality of bots according to the intent of the input.

Referring to the non-limiting example of FIG. 3, at operation 359, the shop bot provides response 309 to the user input, which was provided to the product support bot, stating that "Your Order Was Shipped On Jul. 21, 2018." In this non-limiting example, although the user's input was originally routed to one bot, a response from a different bot was provided without the user having to initiate a new communication session with the different bot.

Figure 4A:
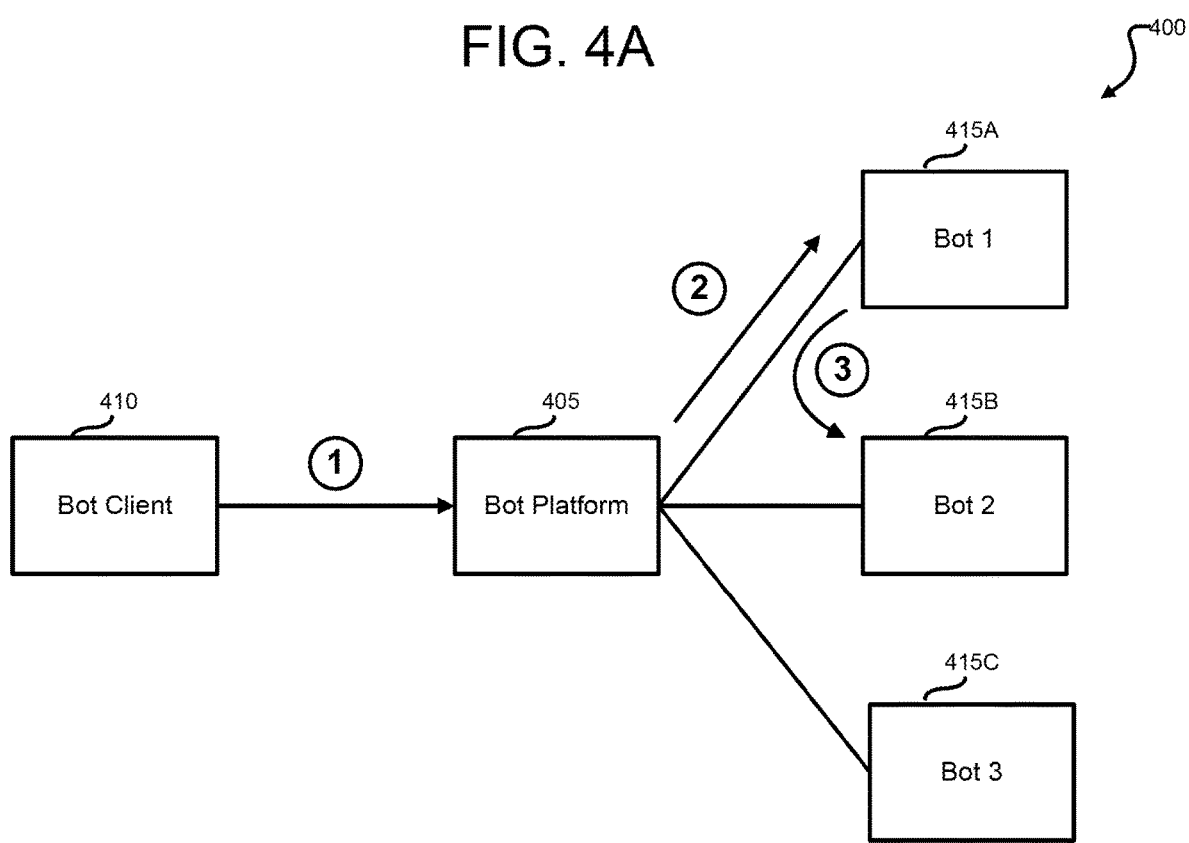
FIGS. 4A and 4B illustrate aspects of the operation and network context of a system and method of a bot platform according to at least one embodiment of this disclosure.
Figure 4B:
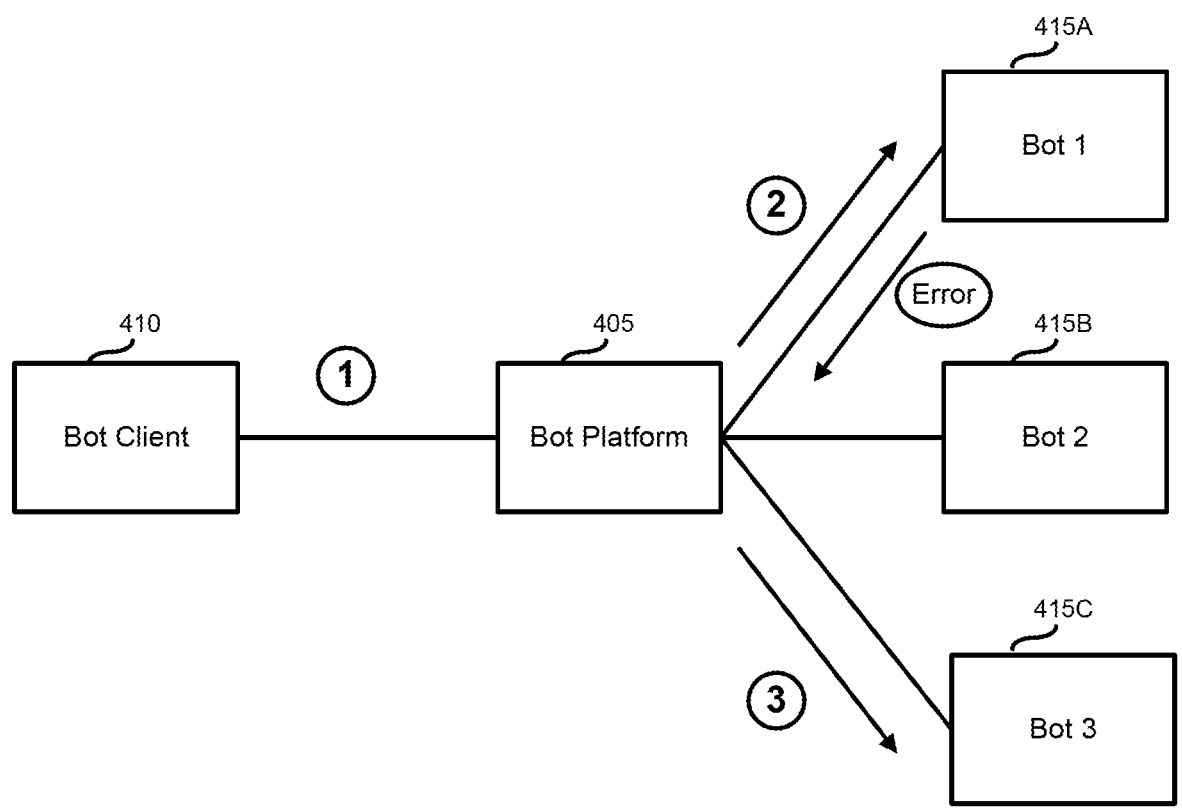

FIGS. 4A & 4B (collectively, "FIG. 4") illustrate aspects of the operation and network context 400 of a system and method of a bot platform according to various embodiments of this disclosure.

Referring to the non-limiting example of FIG. 4, network context 400 comprises a bot platform 405, which can be embodied on any suitable, networked computing apparatus (for example, electronic device 200 in FIG. 2) which is communicatively connected on the client side to a bot client 410, and on the server side to a plurality of bots 415A-415C. As shown in FIG. 4 and described in this disclosure, according to certain embodiments, bot platform 405 facilitates redirection of user inputs associated with intents between bots 415A-C, allowing bot client 410 to act as a single unified interface for interacting with multiple bots.

According to certain embodiments, bot client 410 comprises an application running on a client device (for example, electronic device 100 in FIG. 1), which receives user inputs associated with intents (for example, voice commands or messages typed into a chat session), and passes the user inputs to bot platform 405. In some embodiments, bot client 410 passes the user inputs to bot platform 405 in a format (for example, a chat client markup language) specifically designed to facilitate redirection and handoffs between bots within a single session.

In the non-limiting example of FIG. 4, bots 415A-415C comprise systems embodied on one or more computing platforms (for example, a server), which receive user inputs, and where applicable, user profile or session context information (for example, a chat history, or an identification of the previous bot(s) processing the user inputs, and respond (for example, by providing information, or initiating action, such as cancelling a reservation) according to the intent of the input. In some embodiments, each of bots 415A-415C may include one or more data stores of content (for example, directions on how to configure a product referenced in a user input) to provide in response to the input. Additionally, each of bots 415A-415C may include a natural language processing (NLP) engine for determining the intent of a user input. For the purposes of this purely illustrative example, Bot 1 is a "weather bot" for handling weather-related queries, Bot 2 is a "product support bot" for handling queries regarding a manufacturer's smartphones, and Bot 3 is a "warranty bot" for processing warranty questions regarding the manufacturer's smartphones.

FIG. 4A illustrates an example of redirection among bots according to certain embodiments of this disclosure. As shown by the arrow numbered "1", bot platform 405 initially receives, via a network interface, from bot client 410, an input associated with an intent. In this particular example, the input may be associated with a complex intent, or multiple intents. For example, the input may be a statement of the form, "Is it going to rain today? And if so, will my smartphone be covered under warranty if it gets wet and breaks in today's rain," which includes at least the following intents: 1.) a request for warranty information; 2.) a request for product information; and 3.) a request regarding the weather. Additionally, the received input may be expressed in a client markup language, and may include a deep link identifying the bot to which the query should be directed. The deep link may, in some embodiments, be generated by bot client 410. In other embodiments, the deep link may be generated by bot platform. In addition to the user input associated with the intent, bot platform 405 may also receive, from bot client 410, contextual information to be included in a user profile maintained at the bot platform. Contextual information includes, without limitation, a user id, the date and time of the input, whether the input is received from a registered user, the type of device on which the bot client is operating, and the location of the device on which the bot client is operating.

According to certain embodiments, after receiving an input from bot client 410, bot platform 405 stores the input associated with the intent as part of a user profile maintained at bot platform 405. Further, as shown by the arrow numbered "2," bot platform selects bot 415A (the weather bot) from the plurality of bots according to the intent of the input, and passes the input to bot 415A. In some embodiments, the bot platform selects bot 415A based on a deep link in the user input, for example, a link indicating that inputs with "weather" in the query first be directed to bot 415A. In some other embodiments, bot platform 405 selects bot 415A by applying a combination of natural language processing to a trained model to associate the intent of the user input with a bot from among the plurality of bots.

In some embodiments according to this disclosure, bot 415A redirects the user's input to bot 415B, as shown by the arrow numbered "3." That is, bot 415A selects bot 415B to provide a response according to the intent of the user input. As part of the redirection from bot 415A to bot 415B, bot platform 405 receives an indication that bot 415A has selected bot 415B to provide responses to the user's input. According to some embodiments, bot 415A transmits updated contextual data (for example, the contents of a chat between bot client 410 and bot 415A) to bot platform 405. Additionally, bot platform 405 may, in some embodiments, pass some or all of the updated contextual data to bot 415B.

According to certain embodiments, further redirections from bot 415B to other bots are possible. For example, bot 415B (which, in this case, is a bot configured to provide responses to inputs associated with product support related intents) may pass the user input to bot 415C (which, in this particular example, is a warranty bot) to provide responses according to the intent of the input.

In this non-limiting example, each of bots 415A-415C is configured to communicate and pass information between one another in a common server markup language, which supports deep linking. According to certain embodiments, the common server markup language is an open-source standard, which facilitates onboarding additional bots to which user inputs associated with an intent can be directed from bot platform 405, and affords bot developers autonomy with respect to the choice of bots to which they wish to redirect inputs.

The redirection from bot 415A to bot 415B may be triggered by a number of circumstances. In some embodiments, bot 415A is unable to provide a response to the user input and returns an error condition. In the non-limiting example of FIG. 4, bot 415A is a weather bot, and the user input only tangentially references the weather. As such, bot 415A may determine that it cannot respond to the user input. In other embodiments, the user may, during the course of interacting with bot 415A, provide inputs associated with a different intent than the initial input, thereby triggering redirection to bot 415B.

FIG. 4B illustrates an example of redirection among bots according to some embodiments of this disclosure. In the non-limiting example of FIG. 4B, the redirection of the user's input from a first bot (in this case, bot 415A) to a second bot (in this particular example, bot 415C) is orchestrated by bot platform 405.

As shown by the arrow numbered "1," in the non-limiting example of FIG. 4B, bot platform 405 receives, from bot client 410, an user input associated with an intent. As in the example of FIG. 4A, according to certain embodiments, bot platform 405 also receives contextual data (such as the identity of the device on which bot client 410 is running) along with the user input.

Next, bot platform 405 selects, according to, inter alia, the intent of the input and contextual data received from the bot client, bot 415A as a bot for providing a response to bot client 410. In some embodiments, bot platform 405 passes the user input received from bot client 410 to selected bot 415A.

Referring to the non-limiting example of FIG. 4B, bot 415A is not able to provide a response to the user's input. For example, the received user input may be expressed such that, bot 415A may not be able to accurately resolve the intent of the request. In certain embodiments, as a result of bot 415A's failure to provide a response to the user's input, bot platform 405 receives and logs an error condition from bot 415A.

In some embodiments, bot platform 405 comprises a dynamically trained model for selecting bots according to the intent of user inputs. In response to logging the error condition, bot platform 405 updates the model to reflect the error condition generated by passing the input to a bot which was not able to provide a response.

According to certain embodiments, after receiving the error condition from bot 415A, bot platform 405 selects a second bot from the plurality of bots to respond, via the bot client, to the user input. As shown by the arrow numbered "3," bot platform 405 redirects the user input to selected bot 415C.

FIG. 5 illustrates operations of a method 500 of operating a bot platform according to certain embodiments of this disclosure. According to certain embodiments, method 500 is performed on an apparatus (for example, electronic device 200 in FIG. 2) having a processor, a memory and a network interface.

Referring to the non-limiting example of FIG. 5, at operation 505, a bot platform (for example, bot platform 405 in FIG. 4), receives from a bot client (for example, a bot client running on a device such as electronic device 100 in FIG. 1), an input associated with an intent. According to certain embodiments, the input received at operation 505 is a real-time input provided by a user interacting with an input-output facility of the bot client (for example, a chat session provided by the bot client). In certain embodiments, the input received at operation 505 comes from a web scraping or content monitoring application, which has identified content associated with an intent (for example, a product review reporting a problem to which a product support bot can provide a response).

According to certain embodiments, at operation 510, the bot platform stores the input associated with the intent as part of a user profile. The user profile may, in some embodiments, also include contextual data regarding the input (for example, information identifying the device on which the bot client is running on). Additionally, in certain embodiments, as part of operation 510, the bot platform analyzes and tags the received user input with one or more tags associated with a bot client markup language.

In various embodiments according to this disclosure, at operation 515, the bot platform selects, from a plurality of bots according to the intent of the input, a bot for responding to the input associated with the intent. In some embodiments, the selection of a bot may be based on a trained model (for example, an AI or machine learning model) implemented at the bot platform. In certain embodiments, the selection of a bot at operation 515 may be based on a deep link contained in the user input, or added to the user input as part of being tagged at operation 510.

In some embodiments, at operation 520, the bot platform passes the input associated with an intent to the bot selected at operation 515. In the non-limiting example of FIG. 5, at operation 520, the bot platform also tags the input with one or more tags associated with a bot server markup language, which provides a common language for communications between the bot platform and a plurality of bots communicatively connected to the bot platform.

Figure 6:
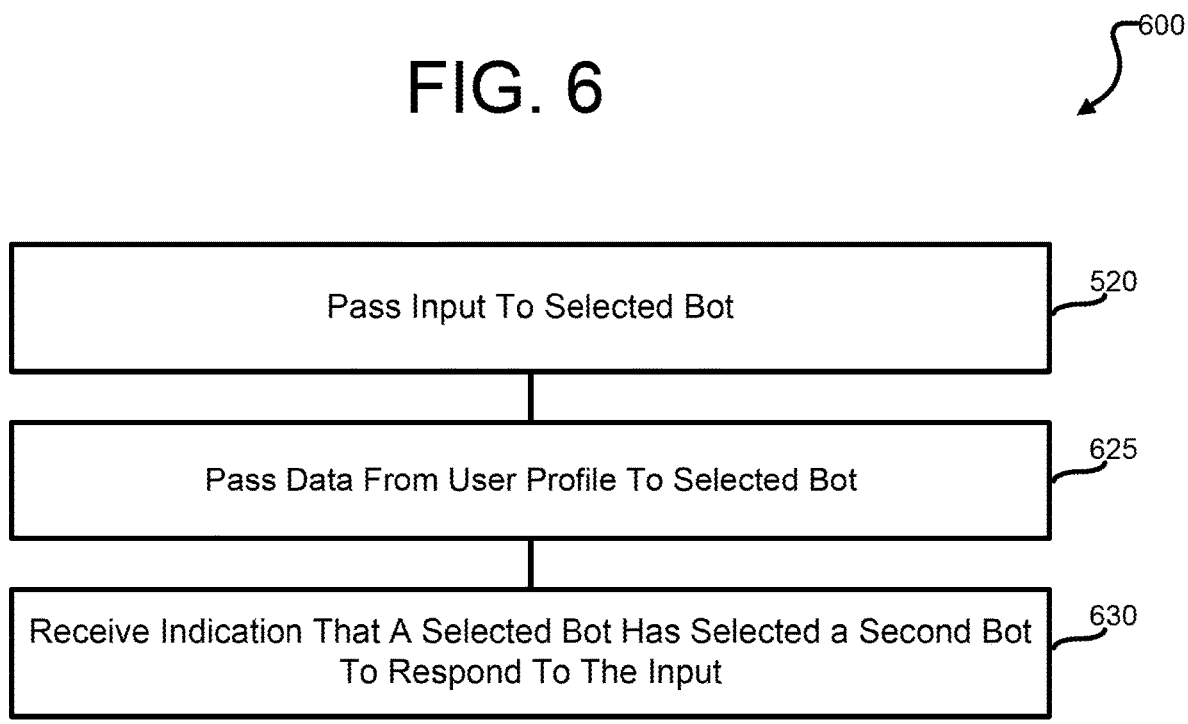
FIG. 6 illustrates operations of a method of operating a bot platform according to some embodiments of this disclosure.

FIG. 6 illustrates operations of a method 600 of operating a bot platform according to certain embodiments of this disclosure.

As discussed elsewhere herein, certain embodiments according to this disclosure provide a mechanism for seamless handoffs between bots providing, through a single bot client (rather than a series of separate bot clients) responses to user inputs associated with intents. In some embodiments, including embodiments of the non-limiting example shown in FIG. 6 the handoffs, or redirections between bots are orchestrated by the bots generating responses. In some embodiments, the redirection between bots is orchestrated by control logic at the bot platform, and in certain embodiments, the redirection is orchestrated by both the bots and the bot platform.

Referring to the non-limiting example shown in FIG. 6, method 600 comprises operations following operation 520 of FIG. 5, where a user input is passed to a selected bot.

As shown in the non-limiting example of FIG. 6, at operation 625, the bot platform passes contextual data from the user profile to the selected bot. The contextual data passed at operation 625, may include, without limitation, a user ID associated with the input, location information associated with the device running the bot client, a history of prior bot interactions by a user, and trending requests (for example, if a manufacturer has released a popular new phone, this information may be useful for responding to user inputs associated with "my new phone.").

In certain embodiments, at operation 630, the bot platform is notified of a bot-orchestrated redirection between bots. Specifically, the bot platform receives an indication that the bot selected at operation 515 of FIG. 5 has selected a second bot to respond to the input. According to some embodiments, the indication received at operation 630 may be expressed in bot server markup language. Further, as part of operation 630, the bot platform may receive additional contextual information (for example, a chat history, or information regarding user inputs associated with intents). According to certain embodiments, this additional contextual information may be stored as part of the user profile maintained at the bot platform.

Figure 7:
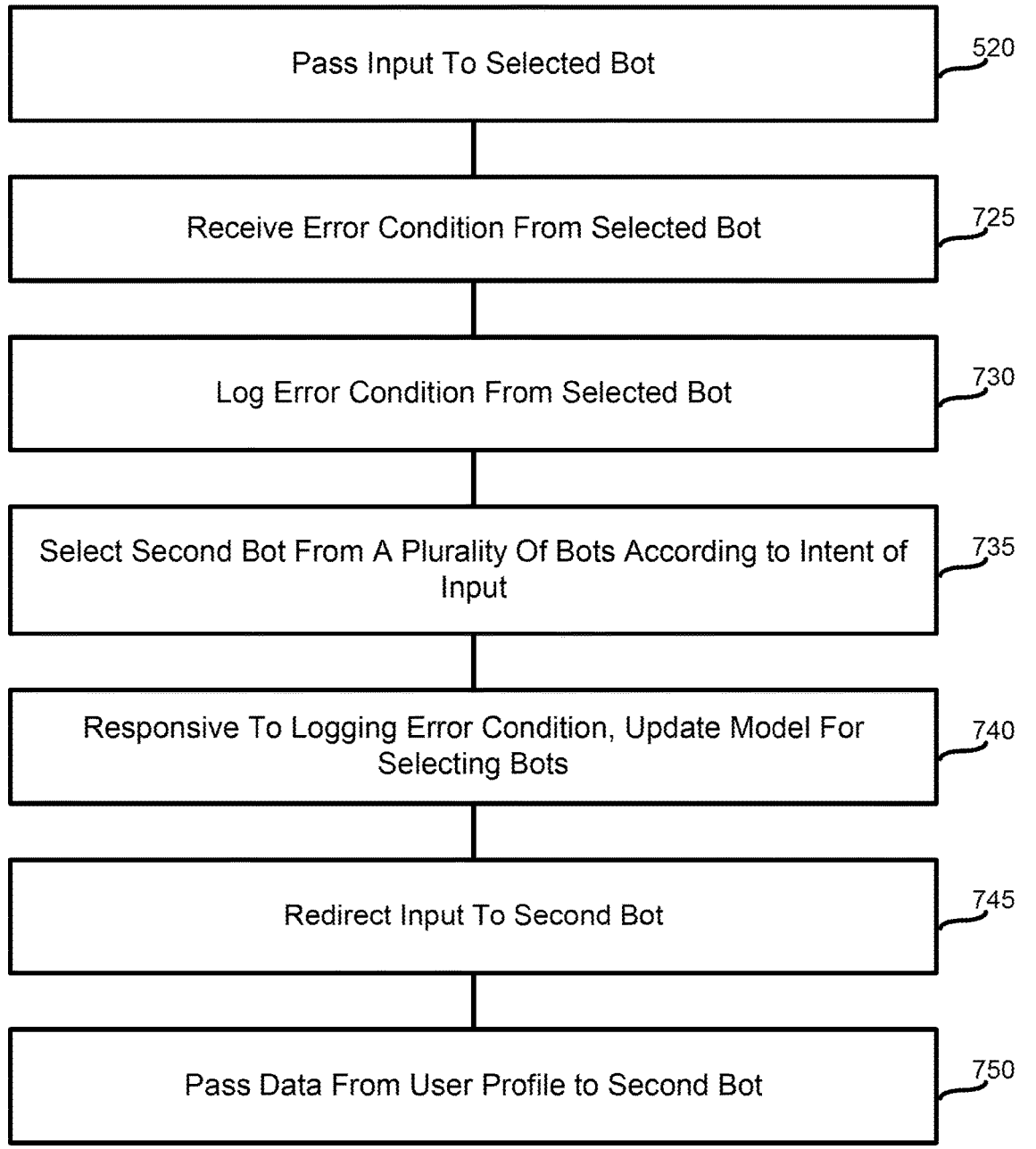
FIG. 7 illustrates operations of a method of operating a bot platform according to some embodiments of this disclosure.

FIG. 7 illustrates operations of a method 700 of operating a bot platform according to certain embodiments of this disclosure. While the non-limiting example of FIG. 7 depicts operations of the bot platform taken in response to an error condition occurring at the bot to which a user intent is passed at operation 520 of FIG. 5, the present disclosure is not so limited, and some or all of the operations shown in FIG. 7 may be performed under other circumstances. For example, operations described with reference to FIG. 7 may be performed following a bot-orchestrated redirection from a first bot to a second bot, such as shown in FIG. 6.

Referring to the non-limiting example of FIG. 7, at operation 520, the input associated with an intent is passed to a selected bot, just as at operation 520 in FIG. 5. In this particular example, the selected bot is unable to respond to the input, which can occur for a variety of reasons, including without limitation, selection of the incorrect bot (for example, an input associated with a weather-oriented intent is passed to a customer service bot) or the selected bot is unable to determine the intent of the input (for example, the input is expressed in slang terms, or in a regional dialect unfamiliar to an NLP engine at the bot). At operation 725, the bot platform receives an indicator of the error condition from the bot to which the input was previously passed at operation 520.

According to certain embodiments, at operation 730, the bot platform logs the error condition received at operation 725. The error condition is, in some embodiments, logged as part of a user profile associated with the bot client or a user thereof, from which an input associated with an intent was received. In some embodiments, the error condition is stored in a data store used for training one or more models for selecting bots according to the intent of inputs received at the bot platform. Such models can be built through supervised, semi-supervised, or unsupervised machine learning, including deep learning involving neural networks.

In some embodiments, at operation 735, the bot platform selects a second bot from a plurality of bots according to the intent of the input. According to some embodiments, operation 735 utilizes the same processing logic as operation 515 in FIG. 5, except that the originally selected bot is excluded from the pool of candidate bots to which the input can be passed. According to various embodiments, the bot platform has one or more secondary bot selection models which can be used to select a second bot, in the event that a main selection model selects a bot which is unable to provide a response to the input.

According to certain embodiments, at operation 740, the bot platform updates a model for selecting bots based on the error condition logged at 730. In some embodiments, the update of the bot selection model performed at operation 740 comprises recalculating a probability that for a received user input (for example, the user input received at operation 505 in FIG. 5), the previously selected bot best accords with the intent of the input. In this way, certain embodiments can iteratively tune and improve the bot selection process performed by the bot platform.

In some embodiments according to this disclosure, at operation 745, the bot platform redirects the input to the bot selected at operation 735. According to certain embodiments, as part of operation 745, the bot platform also updates a user profile associated with the input to reflect the redirection of the input to the second bot.

As shown in the non-limiting example of FIG. 7, at operation 750, the bot platform passes data from a user profile associated with the input to the selected bot. According to some embodiments, the data passed at operation 750 includes records of events from previous postbacks by other bots, timestamps of the bot client's interactions with bots communicatively connected to the bot platform, and other session data.

FIG. 8 illustrates a network context 800 of a bot client and a bot platform according to certain embodiments of this disclosure.

Referring to the non-limiting example of FIG. 8, network context includes a bot platform 805, a client platform 840, a set of bots 850 communicatively connected to bot platform 805, and, for some or all of the bots within set of bots 850, backend bot content providers 870.

According to certain embodiments, bot platform 805 is embodied on one or more servers or networked computing platforms (for example, electronic device 200 in FIG. 2). As shown in the non-limiting example of FIG. 8, bot platform 805 includes a client interface 810, which is communicatively connected to one or more bot clients on a client platform 840. In certain embodiments, client interface 810 operates to receive inputs from bot clients at client platform 840 and to prepare and pass the received inputs to orchestration platform 815. Additionally, client interface 810 is, in some embodiments, the interface through which responses to user inputs provided by bots within set of bots 850 are passed to bot clients operating on bot platform 840. According to certain embodiments, client interface 810 prepares received inputs for orchestration platform 815 by reformatting or tagging the inputs according to a standardized bot client markup language. In some embodiments, client interface 810 prepares received inputs for orchestration platform 815 by examining the inputs to confirm that the inputs are correctly expressed in bot client markup language.

As shown in the non-limiting example of FIG. 8, bot platform 805 includes an orchestration platform 815, which operates to select, according to the intent of the input a bot from set of bots 850 to respond to inputs via client interface 810. In some embodiments, orchestration platform includes a memory of "deep links" or predetermined associations between inputs or intents, and bots for responding to the associated inputs or intents. Additionally, according to certain embodiments, orchestration platform 815 includes a natural language processing engine and one or more machine learning models for determining the intent of an input and selecting a bot for responding to the input according to the intent of the input. Additionally, according to some embodiments orchestration platform 815 manages and updates user profile data 825 and user data 830 maintained at bot platform 805.

In some embodiments, bot platform 805 includes a server interface 820, through which inputs to be passed from bot platform 805 to bots within set of bots 850, as well as responses from bots within set of bots 850 are received by bot platform 805. According to certain embodiments, server interface 820 prepares content passing into or out of bot platform 805 by reformatting or tagging the content in a bot server markup language, which provides a standard language for communications between bot platform 805 and each of the bots within set of bots 850. Additionally, in some embodiments, server interface 820 prepares content passing into and out of the server side of bot platform 805 by confirming that the content is properly expressed in bot server markup language.

According to certain embodiments, bot platform 805 includes stores of user profile data 825 and stores of user data 830. According to certain embodiments, profile data 825 encompasses data relating to a user providing, through a bot client on client platform 840, which can provide context for responding to an input. Examples of profile data include, without limitation, information as to the device serving as client platform 840, a user's name, whether a user is a registered user, and prior purchase information. In some embodiments, user data 830 encompasses data collected during a user's interaction with a bot client, and bots within set of bots 850. User data 830 comprises, without limitation, user input histories, responses provide by bots, and session history data, such as data identifying which bots within set of bots 850 has provided responses to a user's inputs.

As shown in the non-limiting example of FIG. 8, bot platform 805 is communicatively connected (for example, via an LTE or Wi-Fi network) to a client platform 840. In some embodiments, client platform 840 comprises one of a smartphone, a tablet, or other suitable networked computing platform (for example, electronic device 100 in FIG. 1). Client platform provides an operating environment for a plurality of bot clients, shown in FIG. 8 as bot clients 845A-845C. According to various embodiments of this disclosure bot clients 845A-845C include, without limitation, applications through which a user can submit inputs associated with an intent, websites which include chat interfaces (for example, customer support chat), and applications which generate inputs based on observed content, such as by web scraping or monitoring websites (for example, customer review or customer support forums) to generate content associated with intents. According to various embodiments of this disclosure, user can receive responses from more than bot within set of bots 850 through a session with a single bot client on client platform 840.

According to certain embodiments, set of bots 850 comprises an extensible and easily reconfigurable set of bots (which, in this illustrative example are numbered bot 855, bot 860 and bot 865) which have been registered with bot platform as being capable of providing responses to inputs associated with intents provided from bot clients on client platform 840 via bot platform 805. To enhance configurability and facilitate smooth redirection of inputs between bots, each of bots 855-865 utilize the bot server markup language of server interface 820. According to some embodiments, bot server markup language is an open source each of the bots within set of bots 850 is developed, and managed by an entity other than the owner of bot platform 805.

As shown in the non-limiting example of FIG. 8, each bot within set of bots 850 may obtain content for responding to inputs from one or more backend bot content providers 870. In some embodiments, backend bot content providers 870 include, without limitation, a content management system 875 (such as ADOBE EXPERIENCE MANAGER™), one or more artificial intelligence (AI) or natural language processing (NLP) engines 880 or resolving the intents of the received inputs, a support ticket tracking system 885 (for example, JIRA™), and in some embodiments, live operators 890 to handle inputs which are not amenable to machine generated responses.

FIG. 9 illustrates an example 900 of an application of a bot server markup language according to various embodiments of this disclosure. According to certain embodiments, the code shown in FIG. 9 comprises is passed from a bot platform to one or more bots configured to respond to inputs associated with an intent which are received from a bot client.

In the non-limiting example of FIG. 9, the example code comprises application programming interface (API) call with two payloads: a first payload 905 titled "server," and a second payload 910 titled "client."

According to certain embodiments, first payload 905 includes an instance of the method "action," which specifies actions to be undertaken by the bot platform. In this non-limiting example, the actions to be taken by the bot platform include passing an intent associated with an input to a specified bot, as indicated by the code "newIntent": "s8" or "@api.ail:parameters.newIntent" which indicates that the intent associated with the input is "S8" (which, in some embodiments, may correspond to the name of a product about which a user of a bot client has provided an input), or a command to fetch an intent from a server.

In some embodiments, second payload 910 comprises the parameters of a response to be passed from the bot platform to the bot client in response to an input associated with an intent. As shown by the line beginning with "postback," second payload 910 comprises a deep link between the response to the intent and a specific bot (e.g., bot://support-.company.com) connected to the bot platform. Further, as shown by the line beginning with "imageURL," second payload 910 comprises a pointer to content, in this non-limiting example, an image provided by an edge cache, to be included in a response to an input associated with an intent.

FIG. 10 illustrates an example 1000 of an application of a bot client markup language according to various embodiments of this disclosure.

In the non-limiting example of FIG. 10, an example of "data" object expressed in a bot client markup language is shown. According to certain embodiments, responses to inputs are passed to a bot client via a bot platform (for example, bot platform 805 in FIG. 8) as "data" objects expressed in bot client markup language. In this non-limiting example, the "data" object is demarcated by the container "data" tag 1005. In this non-limiting example, a "card" tag 1010 is included within the container instantiated by "data" tag 1005. "Card" tag 1010 specifies an array of card objects 1015*a* & 1015*b* which are presented under a menu tag. According to certain embodiments, card objects 1015*a* & 1015*b* each have the following properties: a "label" whose value comprises a string generally identifying the card object, a "text" whose value comprises a string of text to be displayed as part of the card object, a "imageURL" whose value comprises a pointer (for example, a URL) to an image to be displayed as part of the card object, and a "postback" comprising a deep link to a bot (for example, a bot associated with the domain "bot//support.company.com").

Additionally, in the non-limiting example of FIG. 10, the container instantiated by "data" tag 1005 further comprises a pair of "option" objects 1025*a* & 1025*b*. In certain embodiments, the properties of each of "option" objects 1025*a* & 1025*b* include: a "label" whose value is a string of text to be displayed as part of the object, and a "postback" comprising a deep link to a bot (for example, a bot within the domain "bot://support.company.com") associated with a user input to the "option object.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for operating a bot platform, the method comprising:
   receiving, from a bot client, an input associated with an intent;
   storing the input associated with the intent as part of a user profile maintained at the bot platform;
   selecting, according to the intent of the input, a bot from a plurality of bots communicatively connected to the bot platform to respond to the bot client;
   passing the input to the selected bot; and
   passing data from the user profile maintained at the bot platform to the selected bot,
   wherein the data from the user profile comprises contextual information for redirecting the input from the selected bot to another bot.

2. The method of claim 1, further comprising:
   receiving from the selected bot, an indication that the selected bot has selected a second bot communicatively connected to the bot platform to respond to the bot client according to the intent of the input.

3. The method of claim 1, further comprising:
   receiving an error condition from the selected bot;
   selecting, according to the intent of the input, a second bot from the plurality of bots communicatively connected to the bot platform to respond to the bot client; and
   passing the input to the second bot.

4. The method of claim 3, further comprising:
   logging the error condition received from the selected bot; and
   responsive to logging the error condition, updating a model for selecting bots.

5. The method of claim 1, wherein the bot client is provided as part of a social media application.

6. The method of claim 1, wherein the input associated with the intent comprises web content triggering the bot client.

7. The method of claim 1, wherein the contextual information for redirecting the input from the selected bot to another bot comprises one or more of a user ID, date or time information of the input, information indicating a registration status, device type information, or location information of a type of device on which the bot client is operating.

8. An apparatus, comprising:
   a network interface;
   a processor; and
   a memory containing instructions, which when executed by the processor, cause the apparatus to:
      receive, from a bot client via the network interface, an input associated with an intent,
      store the input associated with the intent as part of a user profile maintained at the apparatus,
      select, according to the intent of the input, a bot from a plurality of bots communicatively connected to the apparatus to respond to the bot client,
      pass the input to the selected bot, and
      pass data from the user profile maintained at the apparatus to the selected bot,
      wherein the data from the user profile comprises contextual information for redirecting the input from the selected bot to another bot.

9. The apparatus of claim 8, wherein the memory contains instructions, which when executed by the processor, cause the apparatus to receive from the selected bot, an indication that the selected bot has selected a second bot communicatively connected to the apparatus to respond to the bot client according to the intent of the input.

10. The apparatus of claim 8, wherein the memory contains instructions, which when executed by the processor, cause the apparatus to:
    receive an error condition from the selected bot;
    select, according to the intent of the input, a second bot from the plurality of bots communicatively connected to the apparatus to respond to the bot client; and
    pass the input to the second bot.

11. The apparatus of claim 10, wherein the memory contains instructions, which when executed by the processor, cause the apparatus to:
    log the error condition received from the selected bot; and
    responsive to logging the error condition, update a model for selecting bots.

12. The apparatus of claim 8, wherein the bot client is provided as part of a social media application.

13. The apparatus of claim 8, wherein the input associated with the intent comprises web content triggering the bot client.

14. The apparatus of claim 8, wherein the contextual information for redirecting the input from the selected bot to another bot comprises one or more of a user ID, date or time information of the input, information indicating a registration status, device type information, or location information of a type of device on which the bot client is operating.

15. A non-transitory computer-readable medium comprising program code, which when executed by a processor, causes an apparatus to:
    receive, from a bot client via a network interface, an input associated with an intent,
    store the input associated with the intent as part of a user profile maintained at the apparatus, select, according to the intent of the input, a bot from a plurality of bots communicatively connected to the apparatus to respond to the bot client, pass the input to the selected bot, and pass data from the user profile maintained at the apparatus to the selected bot, wherein the data from the user profile comprises contextual information for redirecting the input from the selected bot to another bot.

16. The non-transitory computer-readable medium of claim 15, comprising program code, which when executed by the processor, causes the apparatus to receive from the selected bot, an indication that the selected bot has selected a second bot communicatively connected to the apparatus to respond to the bot client according to the intent of the input.

17. The non-transitory computer-readable medium of claim 15, comprising program code, which when executed by the processor, causes the apparatus to:

receive an error condition from the selected bot;

select, according to the intent of the input, a second bot from the plurality of bots communicatively connected to the apparatus to respond to the bot client; and pass the input to the second bot.

18. The non-transitory computer-readable medium of claim 17, comprising program code, which when executed by the processor, causes the apparatus to:

log the error condition received from the selected bot; and responsive to logging the error condition, update a model for selecting bots.

19. The non-transitory computer-readable medium of claim 15, wherein the bot client is provided as part of a social media application.

20. The non-transitory computer-readable medium of claim 15, wherein the contextual information for redirecting the input from the selected bot to another bot comprises one or more of a user ID, date or time information of the input, information indicating a registration status, device type information, or location information of a type of device on which the bot client is operating.

* * * * *